(12) United States Patent
Wang et al.

(10) Patent No.: US 11,960,356 B1
(45) Date of Patent: Apr. 16, 2024

(54) INTELLIGENT TRACKABLE OPERATION GUARD SERVICE IN CLOUD PLATFORMS

(71) Applicant: SAP SE, Walldorf (DE)

(72) Inventors: Yu Wang, Xi'an (CN); Le Zhang, Xi'an (CN); Moritz Semler, Spechbach (DE); Daping Wang, Xi'an (CN); Haoxing Hou, Xi'an (CN); Zuosui Wu, Xi'an (CN)

(73) Assignee: SAP SE, Walldorf (DE)

( * ) Notice: Subject to any disclaimer, the term of this patent is extended or adjusted under 35 U.S.C. 154(b) by 15 days.

(21) Appl. No.: 17/984,377

(22) Filed: Nov. 10, 2022

(51) Int. Cl.
G06F 11/07 (2006.01)

(52) U.S. Cl.
CPC ...... G06F 11/0793 (2013.01); G06F 11/0712 (2013.01); G06F 11/0772 (2013.01)

(58) Field of Classification Search
CPC ............. G06F 11/0793; G06F 11/0712; G06F 11/0772
See application file for complete search history.

(56) References Cited

U.S. PATENT DOCUMENTS

| | | | |
|---|---|---|---|
| 8,701,199 B1* | 4/2014 | Dotan | H04L 63/18 726/25 |
| 10,237,118 B2 | 3/2019 | Du et al. | |
| 10,313,386 B1* | 6/2019 | Roturier | H04L 63/107 |
| 10,686,908 B2 | 6/2020 | Du et al. | |
| 10,997,208 B2 | 5/2021 | Du et al. | |
| 11,080,166 B2 | 8/2021 | Du et al. | |
| 11,176,314 B2 | 11/2021 | Mueller et al. | |
| 11,403,320 B2 | 8/2022 | Wang et al. | |
| 11,422,973 B2 | 8/2022 | Wang et al. | |
| 2003/0056140 A1* | 3/2003 | Taylor | G06F 11/0709 714/4.1 |
| 2006/0218639 A1* | 9/2006 | Newman | H04L 63/105 726/25 |
| 2015/0020204 A1* | 1/2015 | Wang | H04L 67/535 726/25 |
| 2016/0063243 A1* | 3/2016 | Sridhara | H04W 12/12 726/23 |
| 2018/0121326 A1 | 5/2018 | Qi et al. | |
| 2018/0143856 A1 | 5/2018 | Du et al. | |
| 2018/0293379 A1* | 10/2018 | Dahan | G06F 21/568 |
| 2019/0132326 A1* | 5/2019 | Spradlin | H04L 63/20 |

(Continued)

OTHER PUBLICATIONS

U.S. Appl. No. 17/557,147, filed Dec. 21, 2021, Zhang et al.

*Primary Examiner* — Matthew M Kim
*Assistant Examiner* — Matthew N Putaraksa
(74) *Attorney, Agent, or Firm* — Fish & Richardson P.C.

(57) ABSTRACT

Methods, systems, and computer-readable storage media for receiving, by an operation guard system executed within a cloud platform, session information representative of a session of a user within the cloud platform, the session information including user information and operation information, determining, by the operation guard system, that the user is signed into a technical group for execution of an operation represented in the operation information, and in response, providing, by the operation guard system, a risk score associated with the operation, and determining, by the operation guard system and at least partially based on the risk score, that the operation is a risk-oriented operation based on the risk score, and in response, preventing execution of the operation and transmitting an alert.

20 Claims, 3 Drawing Sheets

(56) References Cited

U.S. PATENT DOCUMENTS

| | | | |
|---|---|---|---|
| 2020/0042723 A1* | 2/2020 | Krishnamoorthy | G06F 21/45 |
| 2020/0274946 A1 | 8/2020 | Du et al. | |
| 2020/0285610 A1 | 9/2020 | Wang et al. | |
| 2020/0364345 A1* | 11/2020 | Hecht | G06F 21/577 |
| 2021/0263769 A1 | 8/2021 | Du et al. | |
| 2022/0253459 A1 | 8/2022 | Wang et al. | |
| 2022/0261280 A1 | 8/2022 | Du et al. | |
| 2022/0286465 A1 | 9/2022 | Du et al. | |
| 2022/0400135 A1* | 12/2022 | Gamra | H04L 63/1433 |
| 2023/0170096 A1* | 6/2023 | Sun | G16H 40/63 705/2 |

\* cited by examiner

INTELLIGENT TRACKABLE OPERATION GUARD SERVICE IN CLOUD PLATFORMS

BACKGROUND

Software systems can be provisioned by software vendors to enable enterprises to conduct operations. Software systems can include various applications that provide functionality for execution of enterprise operations. In some instances, software vendors provide software systems as off-premise applications that are executed in cloud computing environments, which can be referred to as cloud-based applications (e.g., applications provided in a so-called Software-as-Service (SaaS) deployment). Cloud-based applications can be provided in a public cloud or a private cloud. In some examples, a public cloud is a SaaS deployment that is agnostic to enterprises, while a private cloud is a SaaS deployment that is specific to a respective enterprise. For example, a vendor can provide a cloud platform for multiple enterprises (e.g., customers) and each enterprise can be treated as a tenant within the cloud platform. Each tenant can have a private cloud that is specific to that tenant and is not accessible by other tenants. For example, private data of a tenant can be stored in the private cloud. A public cloud can be provided, which all tenants have access to. For example, the vendor of the cloud platform can store public data in the public cloud, which all tenants have access to.

In cloud platforms, users can perform operations, which can be referred to as information technology (IT) operations, for the administration of the cloud platform. For example, users (e.g., administrators) of the vendor and/or each enterprise can perform operations for administration of the public cloud and/or a private cloud. In some instances, operations can be referred to as so-called risk-oriented operations. A risk-oriented operation can be an operation that, if executed improperly, can result in irreversible, negative consequences.

In scenarios where a user executes a risk-oriented operation that results in irreversible, negative consequences, a group that the user belongs to is generally responsible. The user and/or other members of the group can be tasked with correcting the situation. In traditional approaches, correction can require an analysis of log data to determine the so-called what, where, who, when (e.g., what operation was performed, in which system(s) was the operation performed, who performed the operation, when was the operation performed) to determine what needs to be done to correct and even prevent such an occurrence in the future. In such approaches, the situation can be mitigated, but the damage that has occurred cannot be.

SUMMARY

Implementations of the present disclosure are directed to an operation guard system for selectively protecting against risk-oriented operations in cloud platforms. More particularly, implementations of the present disclosure are directed to an operation guard system that includes an operation guard service and a set of operation guard nodes, the operation guard system monitoring operations executed within a cloud platform and selectively alerting and acting in response to operations identified as risk-oriented operations.

In some implementations, actions include receiving, by an operation guard system executed within a cloud platform, session information representative of a session of a user within the cloud platform, the session information including user information and operation information, determining, by the operation guard system, that the user is signed into a technical group for execution of an operation represented in the operation information, and in response, providing, by the operation guard system, a risk score associated with the operation, and determining, by the operation guard system and at least partially based on the risk score, that the operation is a risk-oriented operation based on the risk score, and in response, preventing execution of the operation and transmitting an alert. Other implementations of this aspect include corresponding systems, apparatus, and computer programs, configured to perform the actions of the methods, encoded on computer storage devices.

These and other implementations can each optionally include one or more of the following features: the session information is received from an operation guard node executed within a node of the cloud platform; providing a risk score associated with the operation is at least partially based on one or more of a topology list and an operation token tree; the topology list represents historical execution of the operation and the operation token tree represents an order of operations, each operation in the order of operations being associated with an operation type; the operation guard system includes a time-framed session manager that manages multiple concurrent sessions within the cloud platform; the operation guard system includes an account mapping assembler that generates an account mapping that maps a global account of the user to the technical account; and the operation includes one of migrating data from a private cloud to a public cloud within the cloud platform and cleaning up a resource within the cloud platform.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
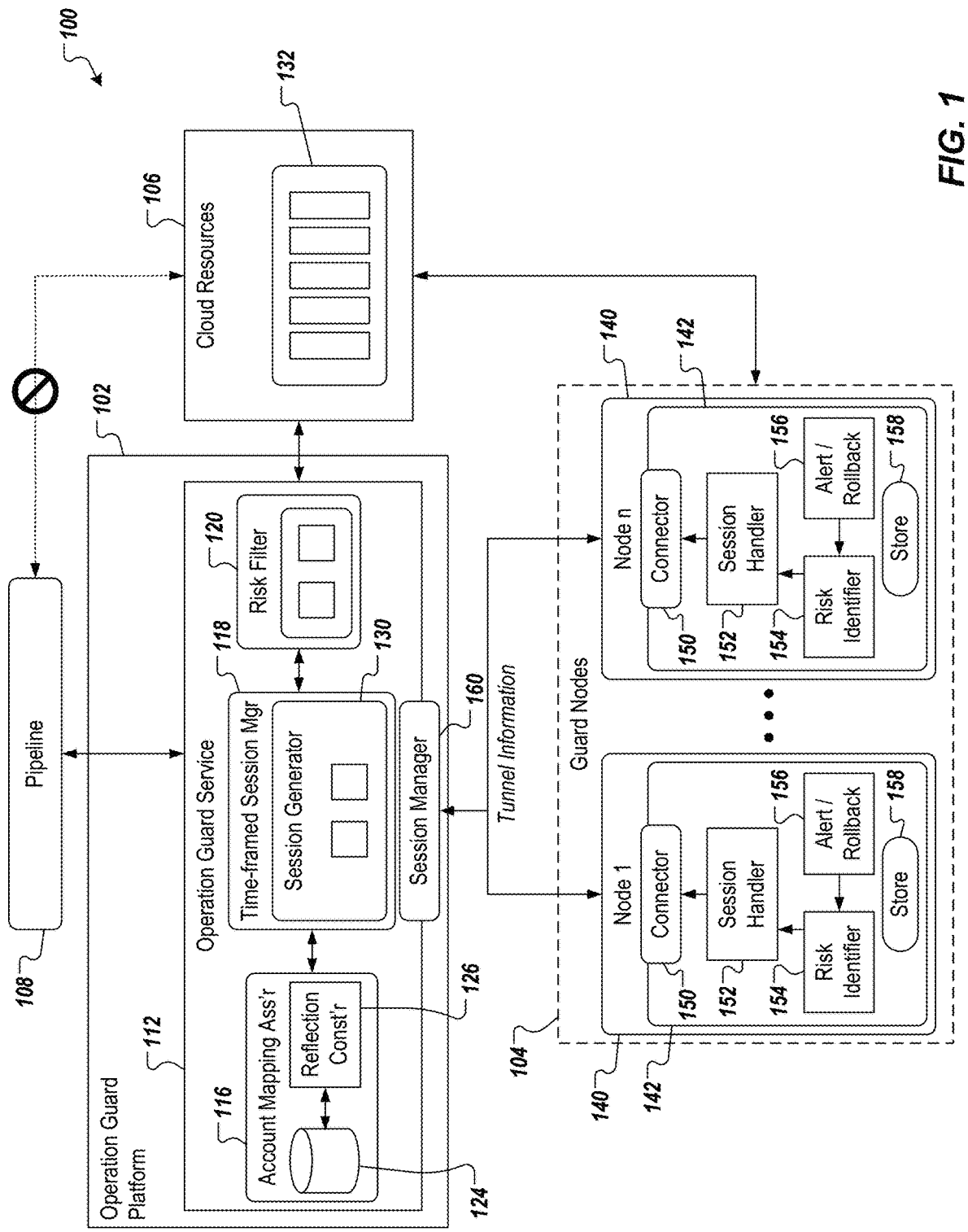
FIG. 1 depicts an example architecture that can be used to execute implementations of the present disclosure.

Implementations of the present disclosure are directed to an operation guard system for selectively protecting against risk-oriented operations in cloud platforms. More particularly, implementations of the present disclosure are directed to an operation guard system that includes an operation guard service and a set of operation guard nodes, the operation guard system monitoring operations executed within a cloud platform and selectively alerting and acting in response to operations identified as risk-oriented operations. Implementations can include actions of receiving, by an operation guard system executed within a cloud platform, session information representative of a session of a user within the cloud platform, the session information including user information and operation information, determining, by the operation guard system, that the user is signed into a technical group for execution of an operation represented in the operation information, and in response, providing, by the operation guard system, a risk score associated with the operation, and determining, by the operation guard system and at least partially based on the risk score, that the operation is a risk-oriented operation based on the risk score, and in response, preventing execution of the operation and transmitting an alert.

To provide further context for implementations of the present disclosure, and as introduced above, software systems can be provisioned by software vendors to enable enterprises to conduct operations. Software systems can include various applications that provide functionality for execution of enterprise operations. In some instances, software vendors provide software systems as off-premise applications that are executed in cloud computing environments, which can be referred to as cloud-based applications (e.g., applications provided in a so-called Software-as-Service (SaaS) deployment). Cloud-based applications can be provided in a public cloud or a private cloud. In some examples, a public cloud is a SaaS deployment that is agnostic to enterprises, while a private cloud is a SaaS deployment that is specific to a respective enterprise.

For example, a vendor can provide a cloud platform for multiple enterprises (e.g., customers) and each enterprise can be treated as a tenant within the cloud platform. Each tenant can have a private cloud that is specific to that tenant and is not accessible by other tenants. For example, private data of a tenant can be stored in the private cloud. A public cloud can be provided, which all tenants have access to. For example, the vendor of the cloud platform can store public data in the public cloud, which all tenants have access to.

In cloud platforms, users can perform operations, which can be referred to as information technology (IT) operations, for the administration of the cloud platform. For example, users (e.g., administrators) of the vendor and/or each enterprise can perform operations for administration of the public cloud and/or a private cloud. In some examples, a user is provided with global credentials within a cloud platform that uniquely identifies the user within the cloud platform. In some examples, the user can be assigned to one or more roles, each role having a set of privileges representing operations that the user is allowed to perform. In some examples, the suer can be assigned to one or more groups, each group having a set of permissions representing operations that users, who are members of the group, are allowed to perform (e.g., one or more roles can be assigned to a group and members of the group inherit the one or more roles). To this end, a group account (e.g., group-owned account, shared cloud account, group member account) can be provided and users that are members of the group represented by the group account can use the group account to log into cloud systems and execute operations.

For example, and without limitation, a user can be included in an administrator group that includes administrator privileges (e.g., root privileges) that enable the user (e.g., as an administrator) to execute operations within the cloud platform. In some examples, the user can execute a first set of operations in the public cloud and a second set of operations in the private cloud. For example, if the user is an agent of the vendor that provides that cloud platform, the number and/or type of operations in the first set of operations can be greater/broader than that of the second set of operations. As another example, if the user is an agent of a customer of the cloud platform, the number and/or type of operations in the first set of operations can be less/narrower than that of the second set of operations. Example operations can include, without limitation, resource configuration, deployment enablement, data migration, and resource cleanup.

In some instances, operations can be referred to as so-called risk-oriented operations. A risk-oriented operation can be an operation that, if executed improperly, can result in irreversible, negative consequences. In some examples, while an operation itself may be reversible (e.g., to mitigate the negative consequences), the negative consequences are not.

For example, and with respect to resource configuration, cloud-critical resource configuration (e.g., resources that, if improperly configured can result in errors within the cloud platform) can be considered a risk-oriented operation. Here, occurrence of errors is an irreversible, negative consequence. The resource configuration can be corrected (reversed) to prevent on-going errors, but the errors that already occurred cannot be reversed.

As another example, and with respect to deployment enablement, a software system can be configured (enabled) for deployment to a production environment. If the software system is not configured properly (e.g., intentional, unintentional errors), production use of the system can be disrupted. Consequently, operations executed to enable a software system for deployment are risk-oriented. Here, if the deployment of the software system is disrupted, the disruption is an irreversible, negative consequence. The software system can be un-deployed and re-deployed to prevent on-going disruption, but the disruption that already occurred cannot be reversed.

As another example, operations executed for data migration (e.g., migrating data within a cloud platform, migrating data between datacenters) can include risk-oriented operations. For example, migrating data from a private cloud to a public cloud can incur risk, such as making private data (e.g., confidential data) publicly available in the public cloud. As another example, migrating data from a datacenter in a first region (e.g., country) to a datacenter in a second region can incur risk, such as violating data privacy laws governing handling of data in the first region and/or the second region. Here, improper movement of data has an irreversible, negative consequence (e.g., private data publicly available for some period of time, data privacy law(s) violated). The data migration can be corrected (reversed) to prevent on-going issues (e.g., continued public availability of private data, continued violation of data privacy law(s)), but the issues that have already occurred cannot be reversed.

As still another example, operations executed for resource clean-up can include risk-oriented operations. For example, resource clean-up can be scheduled such that critical resources (e.g., an authentication system) are available when they need to be available. If a critical resource undergoes clean-up operations out of schedule, errors can occur in the absence of the critical resource. Here, occurrence of errors is an irreversible, negative consequence. The critical resources can be made available again to prevent on-going errors, but the errors that already occurred cannot be reversed.

In executing operations (risk-oriented or otherwise), a user can interact with cloud systems to perform operations on resources in the cloud platform. For example, the user can input commands (e.g., to Linux console, to a Windows shell), press enter, and the command(s) is/are executed in the cloud platform (e.g., copy file across directories). In scenarios where a user executes a risk-oriented operation that results in irreversible, negative consequences, a group that the user belongs to is generally responsible. The user and/or other members of the group can be tasked with correcting the situation. In traditional approaches, correction can require an analysis of log data to determine the so-called what, where, who, when (e.g., what operation was performed, in which system(s) was the operation performed, who performed the operation, when was the operation performed) to determine what needs to be done to correct and even prevent such an occurrence in the future. In such approaches, the situation can be mitigated, but the damage that has occurred cannot be.

In traditional cloud systems, a plain approach is used, which is absent mapping relations from group-owned accounts, shared cloud accounts, and group member accounts. Consequently, key information from group accounts is absent when risk-oriented operations are executed by specified group members in cloud platforms. As a result of this, operations executed on resources within a cloud platform can be absent related information of specific individuals (i.e., users) that executed the operations. In some examples, group-owned accounts are user accounts used to perform administrative operations in cloud platforms (e.g., system maintenance, role/permission grant operations, critical data/process migration). In some examples, shared cloud accounts are accounts used to apply shared-resources operation under specified context-aware cloud environments. Both group-owned accounts and shared cloud accounts are the actual users linked to real cloud resources for various critical cloud operations and processes. In some examples, group member accounts are user-specific accounts that identify the actual personnel who could be originally recorded and followed by portal and login systems. These users are represented the real operators and owned their account information by themselves. Mapping relations in this context means to construct and maintain the mapping information, especially multiple correlation among the cloud accounts, between the two sides of the accounts management. This covers the actual identification between real operator information and operation-critical account information. This is the originated data collection which could be further consumed by follow-on services and related components.

In view of the above context, implementations of the present disclosure provide an operation guard system that includes an operation guard service (OGS) and a set of operation guard nodes (OGNs). In some implementations, the operation guard system monitors operations that are to be executed and/or that have been executed within a cloud platform and selectively alerts and acts in response to operations identified as risk-oriented operations. In some examples, and as described in further detail herein, an operation that will result in a negative consequence and/or is likely to result in a negative consequence can be prevented from execution. For example, instead of immediately executing a command entered by a user, the operation guard system of the present disclosure evaluates the command in terms of risk and can selectively prevent execution of the command. As described in further detail herein, evaluation of the command is based on a lineage and/or a topology. By selectively preventing execution of commands that can result in a negative consequence, implementations of the present disclosure prevent occurrence of the negative consequence and conserves the time and resources that would be required to make corrections and mitigate the negative consequence.

Implementations of the present disclosure are described in further detail herein with reference to an example cloud platform. The example cloud platform includes SAP HANA Cloud, provided by SAP SE of Walldorf, Germany. SAP HANA Cloud can be described as a database as a service (DBaaS) foundation for modern applications and analytics across enterprise data. It is contemplated, however, that implementations of the present disclosure can be realized with any appropriate cloud platform.

FIG. 1 depicts an example architecture 100 in accordance with implementations of the present disclosure. In the depicted example, the example architecture 100 includes an operation guard platform 102, a set of guard nodes 104, cloud resources 106, and a pipeline 108. In some examples, the operation guard platform 102, the set of guard nodes 104, the cloud resources 106, and the pipeline 108 are provisioned within a cloud platform. In the example of FIG. 1, the operation guard platform 102 includes an operation guard service 112.

In some examples, the operation guard system of the present disclosure includes the operation guard service 112 and the operation guard nodes 104. In the example of FIG. 1, the operation guard service 112 includes an account mapping assembler 116, a time-framed session manager 118, and a risk filter 120. The set of guard nodes 104 includes nodes 140, each node 140 having a guard node agent 142. In the example of FIG. 1, each guard node agent 142 includes a connector 150, a session handler 152, a risk identifier 154, an alert/rollback module 156, and a data store 158. Each node 140 communicates with the operation guard service 112 through a session manager 160.

In some implementations, the cloud resources 106 represent resources that are provisioned within the cloud platform (e.g., by a vendor) for use by one or more enterprises. In some examples, the resources can be provisioned within one or more public clouds and one or more private clouds. Example resources can include, without limitation, database systems, applications, servers, physical machines, virtual machines, containers, and the like.

In accordance with implementations of the present disclosure, the operation guard service 112 receives commands through the pipeline 108. In some examples, the commands include commands that can affect one or more resources in the cloud resources 106. For example, any administrator-level command that is entered to a Linux console, to a Windows shell, or the like, is directed to the operation guard service 112. In this manner, such administrator-level commands are not directly communicated to the cloud resources 106.

As described in further detail herein, the operation guard system of the present disclosure (e.g., the operation guard service 112, the operation guard nodes 104) provide runtime monitoring of sessions to identify and selectively filter risk-oriented operations. In some examples, a session can be described as a user (e.g., administrator) communicating with one or more cloud resources to execute operations thereon. In some implementations, the operation guard system determines whether a risk-oriented operation is to be conducted, and selectively prohibits execution of the risk-oriented operation. Further, implementations of the present disclosure track relationships between individual users and group accounts, collect trackable data over specified cloud operators, and guard and prevent any risk-oriented operations to resources in the cloud platform that can result in irreversible damage.

In further detail, at the beginning of a session, a user can be authenticated through a group account, which is itself authenticated using, for example, single sign on (SSO) and a security assertion markup language (SAML) certificate. For example, the user can log into the group account using a global account (e.g., user@company.com), which log-in can be used for the group account to log in to perform operations on cloud resources. For example, the global account of the user is alone insufficient for the user to log into a cloud system to execute operations. Instead, the user logs into a group account for a group that the user is a member of, and the group account is used to log into a cloud system to execute operations.

In accordance with implementations of the present disclosure, the operation guard service 112 captures and extracts account information from these log-in activities. In some examples, the operation guard service 112 leverages a group-owned accounts registry. For example, when a login activity occurs, an event can be triggered by a registry watcher, whereby the specific group member account can be consumed to generate the mapping information between this account and all possible group-owned accounts in the form of data matrix. The related access information and corresponding metadata from the registry can be extracted and populated in the template managed by the registry. In this manner, the operation guard service 112 can fetch the generated data matrix with the form provided by the registry to continue operations, as described herein, within the overall service pipeline.

In some examples, proper group-owned shared accounts would be granted from a group-own accounts registry for specified role-based scope of operations (i.e., operations that can be executed for a specified role). In some examples, after the account option is selected and granted, mapping information of accounts covering group-owned shared account and individual group member account are generated the account mapping assembler 116. The specified group-owned shared account can execute (scheduled) operations on cloud resources. In some examples, the account mapping assembler 116 collects the data matrix with real login member accounts and possible group-owned accounts metadata as the population of combination template from registry. The mapping information is generated by attaching to the data matrix as the prior information structure and filled with specific run-time system and context-award information when actual system/process operation performed. In some examples, the mapping information includes the encoded real member accounts in the digital form with group-tag and index, concrete group-owned accounts matrix reference, actual system/process operation type ID with runtime reflection code and other required security/compliance information. The content of the mapping information is actively refreshed controlled by the runtime operation monitoring and template refresh from registry notification.

In accordance with implementations of the present disclosure, actions of users are captured and maintained by the time-framed session manager 118. In some implementations, the time-framed session manager 118 takes control of the connected and stateful information covering, for example, group-owned shared accounts, specific individual group member accounts, and operation directives. In some examples, if an operation is to be executed by a group-owned shared account, the risk filter 120 would perform action checks whether the operation is risk-oriented for cloud resources. In view of a definition of risk policy settler, the risk filter 120 determines whether to prevent the operation or prompt a warning and generate logs before the operation is executed. The overall operation information is stored and maintained in the form of trackable information (or any appropriate form) for the further safety and compliance processes.

In further detail, the account mapping assembler 116 extracts account path information from a group accounts registry 124, constructing relation matrix, referred to herein as an account mapping, between group-owned, shared accounts and individual group member accounts. The account mapping is used by time-framed session manager 118. In some examples, the account mapping includes the data content of account-operation matrix information and mapping operator selector for the overall mapping functionality. Due to the various types of group-owned accounts and shared cloud accounts, for example, the account mapping functionality enables a mapping operator selector to determine which mapping operator is selected to perform the appropriate mapping activities with correct data structure. The generated account mapping contains the encoded real member accounts in the digital form with group-tag and index, concrete group-own accounts matrix reference, actual system/process operation type ID with runtime reflection code and other required security/compliance information.

For example, the global account of the user (e.g., user@company.com) cannot be used to execute operations in the cloud platform. Instead, the global account is mapped to one or more technical accounts (group-owned shared accounts), which the user logs into to perform operations within the cloud platform. The account mapping maps the global account to the technical group account(s).

In some examples, the account mapping assembler 116 reconstructs the account mapping. For example, in terms of service updates, when a service composed of multiple micro-services has updated resource permissions and/or access control policies, the original mapping information needs to be regenerated in an augmented mode with mapping matrix/topology graph refresh. This series of mapping reconstruction is performed in the near-real-time with support of accounts registry notification and regeneration from the account mapping assembler 116, which operates in a watcher mode. As another example, when roles/permissions on underlying micro-services are changed, their operation strategy and related resource access plan, detective try-catch runtime processes will block the ongoing operations and get the feedback including the information from signal data. This requires the reconstruction of the account mapping. More generally, during runtime of cloud operation processes, switching between various resource operation risk levels, the system could perform different administrative policy and sub-set management approaches dynamically, this demands the accounts mapping to adapt to the related platform requirement through reconstruction.

In some examples, the assembler 116 leverages the group-own accounts registry to fetch information representative of operative accounts and indexing required for role-based secure cloud accounts. The actual generation of assembly work is combined to extraction of cloud resource account information, linking individual group member accounts to group-owned accounts, and tagging the related time-based data for specified mapping operations. In some examples, the real member account information used for login and all possible mapping link recorded for the real member account to generate the original account mapping matrix are retrieved. When the actual group-owned account switch event occurs, the corresponding group-owned account information with proper critical level graph is attached to the original account mapping matrix, and the matrix is provided in a data structure (e.g., using JSON) populated with required data sections. After specific cloud operation/process performed by this group-owned account controlled within runtime session management, the assembler 116 is be notified and patches the related context-specific information to the mapping data structure with respect to runtime operation type index, resource configuration constraints, risk level configuration tag and other security/compliance required information and related data sections.

In some implementations, the account mapping is stored in a datastore (e.g., in-memory database), which enables components, such as the time-framed session manager 118, to interact with the information in real-time (e.g., without loading data into memory). In this manner, which user is attempting to perform an operation can be determined and tracked in real-time, as the user attempts to execute operations in the cloud platform. This is in contrast to traditional approaches that require access to and analysis of log data from a data logging service, for example, which cannot be performed in real-time in view of implicit delays.

In some implementations, historical traces of particular user accounts are provided, which shows what operations respective users have done before. In some examples, the historical trace of a particular user account is provided by a risk filter as the raw traces are distilled and extracted to distinctly provide decision guides when risk-oriented operations are consumed by the risk filter. In some examples, the historical trace is converted from a raw format to a populated tag-based stack format for consumption by risk filter. In some examples, the historical trace enables the time-framed session manager 118, discussed in further detail herein, to leverage runtime accounts mapping information from account mapping assembler and the historical trace mining information from risk filter to make sure the distributed guard nodes could make further reasonable and explainable operations managed by the session handler.

In accordance with implementation of the present disclosure, the time-framed session manager 118 provides functionality for session generation and management to spawn and maintain connected and stateful sessions and required information of cloud resource operations taken by group-owned shared accounts, also referred to herein as technical accounts. As introduced above, logging into a group-owned shared account is performed using authentication and identification of SSO based on SAML certificates. In some implementations, the time-framed session manager 118 maintains tuples representing group-owned shared accounts, individual group member accounts, and operation directives. In some implementations, the time-framed session manager 118 provides the capability to capture snapshots of execution context of each active session, if any compliance, safety, and audit processes are to be performed.

In some implementations, the time-framed session manager 118 spawns and manages multiple, concurrent sessions. In some examples, for each session, the time-framed session manager 118 stores session and connection information in a session entity (e.g., data object) for the group member account and group-owned shared account associated with the session (i.e., the information used to login and start the session). In some examples, each session entity is represented by key information representing individual group member accounts, group-owned shared accounts, and cloud resource operation directives. In some examples, the cloud resource operation directives can be described as a compact data structure designed to cover the required runtime information for specific operations with detailed information which will be further consumed by the distributed guard nodes. In some examples, the cloud resource operation directives include the operation ID, operation type/description data pair, historical and evaluated operation risk pre-definition. This operation directive is leveraged by the initialized risk identifier and possible generated alert/roll-back micro-service when critical risky operation/process occurred on distributed end with monitored guard nodes. In some examples, the session entities hold run-time information for each request from cloud resources users. As such, each group-owned shared account triggered by specific individual group member account for operations that are to be performed spawns a session for the tracking and feedback. This could make sure that every serial operation could be retrospectively recorded and tracked to the specific group member for safety and compliance requirements.

In some implementations, the time-framed session manager 118 provides time-defined functionality of session management for operations. For example, activities that are to be executed in response to an operation can be executed based on time-defined frames, also referred to as time segments. For example, an operation for data migration can be considered to migrate a data set from a private cloud to a public cloud. In this example, if the data set (or portion thereof) should not have been moved to the public cloud, a rollback is required. In some implementations, the time-framed session manager 118 can restrict data migration into time-based segments. For example, if the data set is to be migrated over a period of time (e.g., 3 hours), within this time-framed session, time segments (e.g., 20 mins) can be defined and data can be migrated within a first segment to minimize damage. More particularly, the overall data migration process is segmented into defined pieces and segments in the time unit, such as a 20-minute migration phase. That means, for example, 9 segments can be used to complete the overall data migration in 3 hours, in this example. Any ongoing time-framed data segment can be identified as a risk-oriented against system defined sensitivity level evaluation or data compliance requirement. The feedback service will post the notification and a process will roll-back the migration to prevent any further damage under the specific circumstances.

In accordance with implementations of the present disclosure, the risk filter 120 selectively identifiers operations as risk-oriented operations to enable generation of risk alerts and prevention of risk-oriented operation prevention. In some examples, the risk filter 120 leverages a specified risk policy settler activation and operation filter service. The risk filter 120 can identify any risk-oriented operation based on a risk policy template. In some examples, the risk policy settler activation is the instantiation process to generate the proper risk policy settler, which contains the corresponding risk policy configuration and rule trigger reference to identify when critical operation sequences are being performed. In some examples, the risk policy templates are the prior data frame defined for runtime data population when further risk-oriented operations are identified by filter engine in the form of risk linked-topology stack.

A non-limiting example of how these are used to determine whether an operation is considered a risk-oriented operation is provided for purposes of illustration. In this example, after a specified group-owned account is switched to an operation-ready mode, the risk filter 120 can be notified with accounts-matrix information to generate the referred risk linked-topology stack for possible and correlated risk policies. For every following critical cloud operation that is performed, the related risk policy template will be populated accordingly for grading with risk scores with supportive information from risk policy evaluation scoring and history trace distilled index matching. The populated risk policy template is shared in the near-real-time data form which could be consumed by the risk filter 120 to evaluate whether the operation should be pass, alert/abort, or rollback. All the steps and processes are maintained and controlled by the time-framed session manager with respect to time and cloud resource monitoring and identification.

In some implementations, the risk filter 120 evaluates single, one-off operations that are commanded and evaluates serial operations. In some examples, a single, one-off operation is an operation that is executed to provide an immediate result. For example, to clean-up a resource, a single, one-off operation can be executed, which identifies the resource and instructs cleaning of the resource (e.g., shutting down the resource within the cloud platform). Any negative result will occur immediately after the operation is executed. In some examples, serial operations include a set of operations that are executed in an order to provide a result. In this example, individual operations might not be considered as risk-oriented, but collectively represent risk. For example, a first user (e.g., associated with a customer) can populate configuration information into a cloud platform to configure a resource, and a second user (e.g., associated with a vendor of the cloud platform) can populate other configuration information, which is to be merged with the existing configuration information. In this example, the configurations can conflicts (e.g., customer defines permissions for users/groups, the vendor changes permissions resulting in a conflict that can cause negative consequence).

In some implementations, for each operation, the risk filter 120 performs a lineage and topology analysis to analyze the operations and/or and series of operations and provide risk score that indicates a level of risk. In some examples, if the risk score exceeds a threshold risk score, the operation is considered to be a risk-oriented operation and execution of the operation is presented. In such scenarios, the user that entered the command to execute the operation can be notified and/or another user can be notified (e.g., a decision maker that can make a final decision on whether the operation can be executed).

In some examples, a topology list is provided and includes a pre-defined list that contains topology elements as a compound data structure that represents operations and metadata of operations. In some examples, the metadata represents historical execution of operations. By way of non-limiting example, the metadata can indicate that clean-up of cloud resources are performed each week on a specified day and within a specified timeframe. In some examples, an operation token tree is provided, in which each node represents an operation token (e.g., representing an operation such as resource clean-up, or data migration) and edges between nodes can be directed to provide an order of operations. In some example, the operation token tree is provided as a binary tree that provides time- and resource-efficient search of operations within the tree.

In some examples, the topology list is a data structure that can be used to analyze the intertwined and linked operations which consume cloud resources and any possible sensitive data operations. The topology list represents the cloud resource-referred and operation lineage data structure as the locally standard form of the sequences of operations. In some examples, the operation token tree is used to quickly search and identify the corresponding relationship among the group of operations that can trigger some specific risk-oriented damages to the platform. For determining risk of specific critical operations or group of operations, the topology list is used to help generate the evaluation outcome and scoring stage for linked operations for critical or sensitive processes. The operation token tree is a fast-forward search data structure for scoring the risk-oriented operation or groups of operations when complex and long-term processes performed so that the filter engine could make decision whether the complicated operation sequences reach the risk threshold or need any potential risk alert or rollback actions.

For example, a user can enter a command to execute an operation to clean a resource, the command can be associated with a timestamp indicating a date/time that the command was entered. The risk filter 120 can determine a clean-up schedule for the resource and can compare the command to the clean-up schedule. For example, the risk filter 120 can determine the type of command as resource clean-up and the specific resource that is to be cleaned-up (e.g., based on a resource identified that uniquely identifies the resource) and can retrieve a clean-up schedule for the resource from a datastore. The clean-up schedule can define a day and timeframe for clean-up of the resource. If the command to execute the operation is not received on the day and/or within the timeframe, the operation can be assigned a relatively high risk score indicating that the operation is a risk-oriented. In this example, an alert can be provided to the user indicating that the operation is being prevented, because it is outside of the day and/or timeframe.

In some examples, a series of operations can be determined to be risk-oriented. For example, a complex cloud resource reconfiguration would require multiple configuration definition and instantiation operations. During the activation process of these configuration stages, evaluating each configuration would pass the resource sensitivity and data compliance check. But, for some integration impact after multiple configuration assignment, the overall impact may have risk-oriented property and possible damage to the cloud resources. For example, one data bulk can be granted sensitive operation permission within the scope following the expanded access role under switch to public cloud, which did not pay attention to the leakage for fine-grained access permission shrinkage under public cloud environment. The risk filter has the prepared risk identified operator covering the cross-scope role/access reflection validator to make sure runtime guard session could identify and segment the related operation or groups of operations under the control of time-framed session. The further alert, abort or rollback actions can be performed to prevent the series of operations mentioned above to minimize the damages to the cloud resource and related platform.

In some implementations, the operation guard nodes 142 operate in conjunction with the risk filter 120 to identify risk-oriented operations and alert/prevent execution. In some examples, a user can log into the cloud platform through a respective node 140. For example, the user can log into a tenant database at a node 140 to execute one or more operations on the tenant database (e.g., configurations). In some examples, the session handler 152 communicates session information to the operation guard service 112 through the connector 150 and the session manager 160. Example session information can include, without limitation, user information (e.g., global user account, group-owned shared account) and operation information (e.g., operation token, resource identifier). In some examples, the operation guard nodes 142 provide alerts to the user for any risk-oriented operations that have been identified.

In some examples, each guard node has the complete capacity to judge the risk level and perform the threshold/scoring stage with required accounts-mapping information, historical operation-accounts distilled index data and risk filter operator combination from the central service. This is the autonomous approaches suitable for complex and multi-cloud environment. In some examples, and as multi-cloud environment, a distinct context is more likely to perform the major role on cloud ecosystem. Thus, the operation guard service generates the pool-based session handler with time-framed pre-defined for any possible distributed operation accounts with console and provides the related accounts-mapping and risk filter operator push to guard nodes through the session manager. The distributed guard nodes monitor the sequences of risk-oriented or critical cloud operations and do the identification of risk, possible alert/rollback decision and other required risk evaluation work. The outcome of any feedback notification and events will be instantly uploaded to the central operation guard service for any defined analysis and further evaluation.

Figure 2:
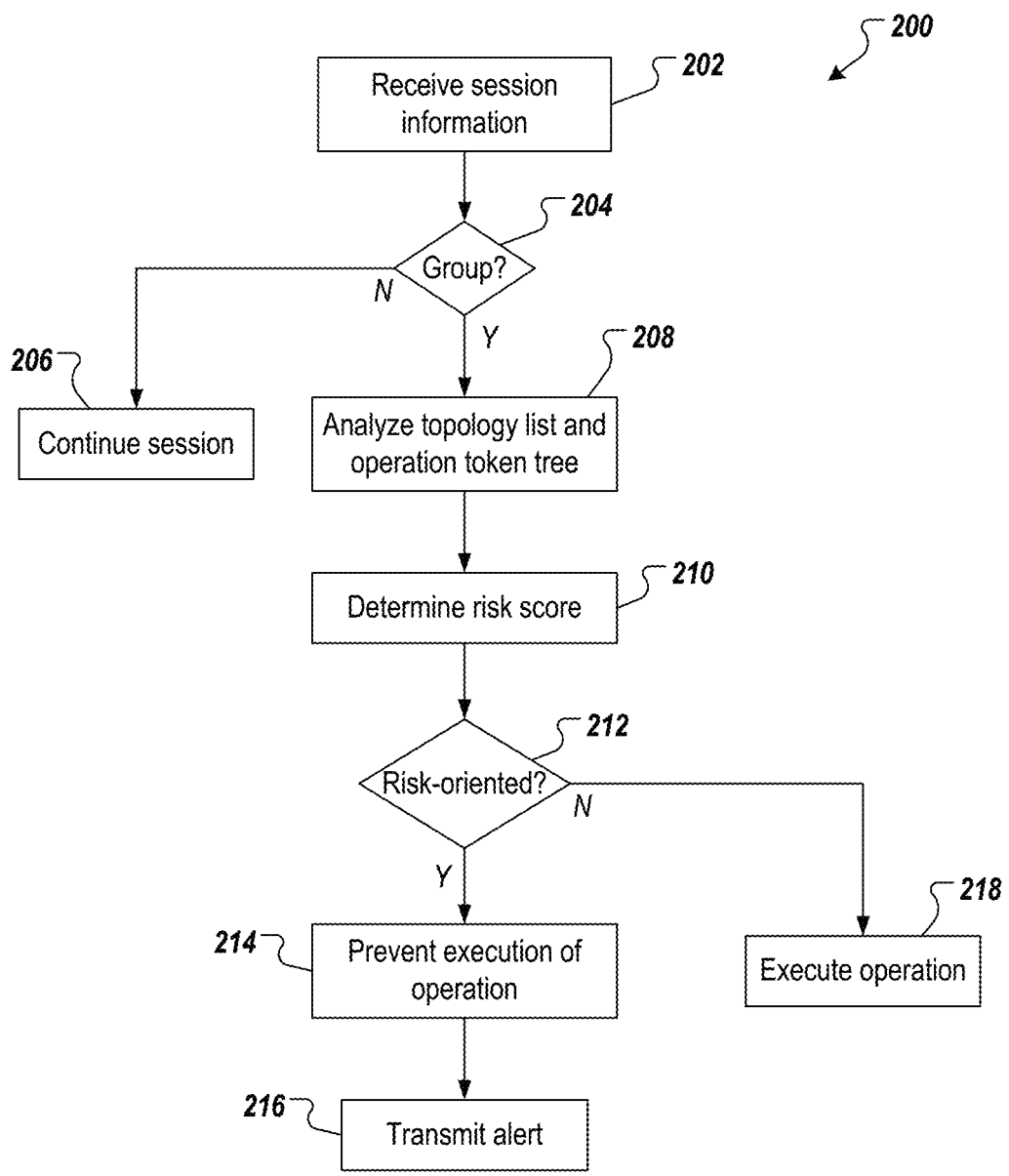
FIG. 2 depicts an example process that can be executed in accordance with implementations of the present disclosure.

FIG. 2 depicts an example process 200 that can be executed in accordance with implementations of the present disclosure. In some examples, the example process 200 is provided using one or more computer-executable programs executed by one or more computing devices.

Session information is received (202). It is determined whether the user is signed into a technical group (204). If the user is not signed into a technical group, the session continues (206). If the user is signed into a technical group, a topology list and/or an operation token tree are analyzed (208). A risk score is determined (210). It is determined whether the operation is a risk-oriented operation (212). If the operation is a risk-oriented operation, execution of the operation is precented (214) and an alert is transmitted (216). If the operation is not a risk-oriented operation, the operation is executed (218).

Figure 3:
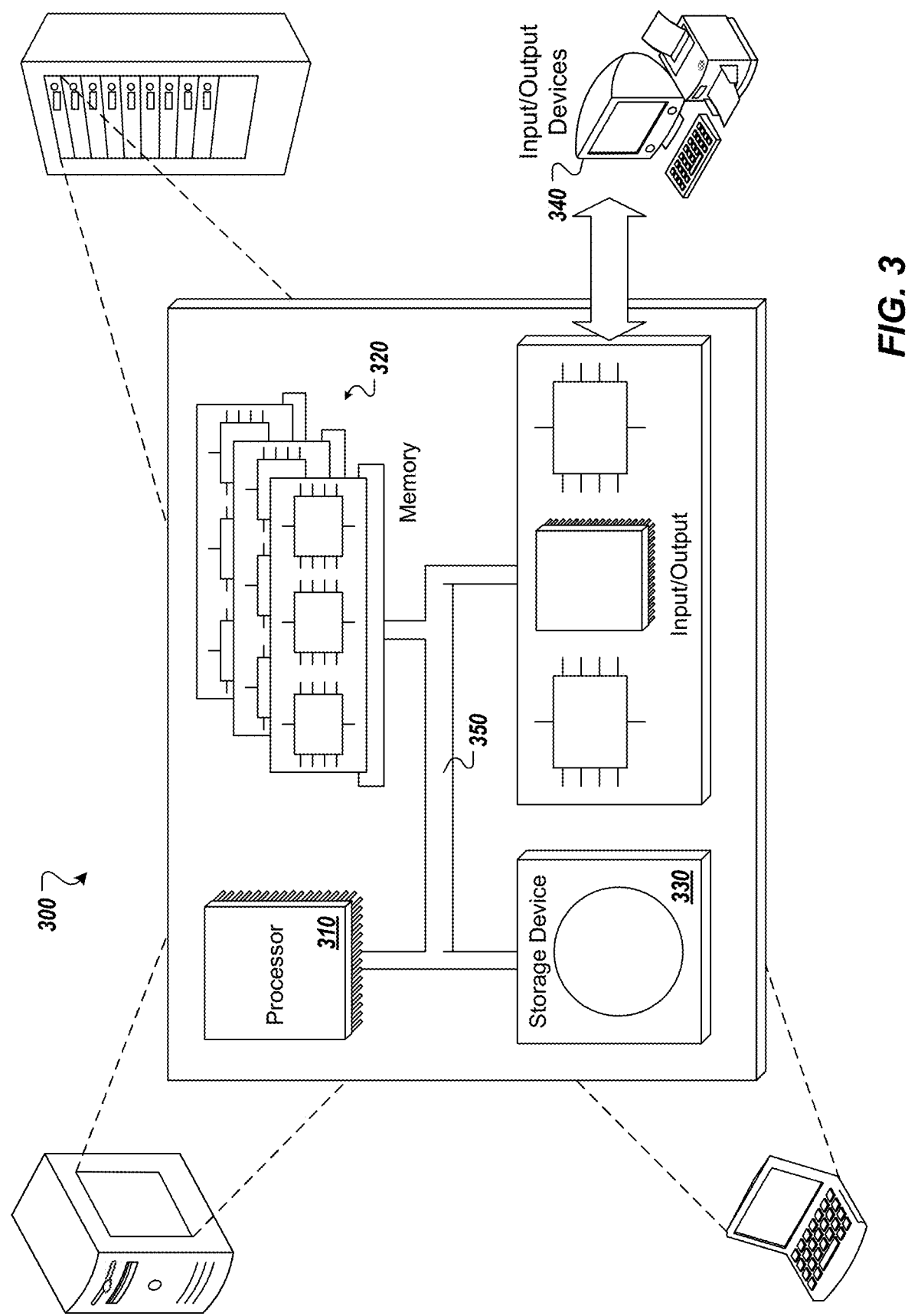
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 may be included in any or all of the server components discussed herein. The system 300 includes a processor 310, a memory 320, a storage device 330, and an input/output device 340. The components 310, 320, 330, 340 are interconnected using a system bus 350. The processor 310 is capable of processing instructions for execution within the system 300. In some implementations, the processor 310 is a single-threaded processor. In some implementations, the processor 310 is a multi-threaded processor. The processor 310 is capable of processing instructions stored in the memory 320 or on the storage device 330 to display graphical information for a user interface on the input/output device 340.

The memory 320 stores information within the system 300. In some implementations, the memory 320 is a computer-readable medium. In some implementations, the memory 320 is a volatile memory unit. In some implementations, the memory 320 is a non-volatile memory unit. The storage device 330 is capable of providing mass storage for the system 300. In some implementations, the storage device 330 is a computer-readable medium. In some implementations, the storage device 330 may be a floppy disk device, a hard disk device, an optical disk device, or a tape device. The input/output device 340 provides input/output operations for the system 300. In some implementations, the input/output device 340 includes a keyboard and/or pointing device. In some implementations, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for real-time identification of operations as risk-oriented operations in cloud platforms, the method being executed by one or more processors and comprising:
   receiving, by an operation guard system executed within a cloud platform, session information representative of a session of a user within the cloud platform, the session information comprising user information and operation information;
   determining, by the operation guard system, that the user is signed into a technical group for execution of an operation represented in the operation information, and in response:
      providing, by the operation guard system, a risk score associated with the operation; and
   determining, by the operation guard system and at least partially based on the risk score, that the operation is a risk-oriented operation based on the risk score, and in response:
      preventing execution of the operation and transmitting an alert.

2. The method of claim 1, wherein the session information is received from an operation guard node executed within a node of the cloud platform.

3. The method of claim 1, wherein providing a risk score associated with the operation is at least partially based on one or more of a topology list and an operation token tree.

4. The method of claim 3, wherein the topology list represents historical execution of the operation and the operation token tree represents an order of operations, each operation in the order of operations being associated with an operation type.

5. The method of claim 1, wherein the operation guard system comprises a time-framed session manager that manages multiple concurrent sessions within the cloud platform.

6. The method of claim 1, wherein the operation guard system comprises an account mapping assembler that generates an account mapping that maps a global account of the user to a technical account.

7. The method of claim 1, wherein the operation comprises one of migrating data from a private cloud to a public cloud within the cloud platform and cleaning up a resource within the cloud platform.

8. A non-transitory computer-readable storage medium coupled to one or more processors and having instructions stored thereon which, when executed by the one or more processors, cause the one or more processors to perform operations for real-time identification of operations as risk-oriented operations in cloud platforms, the operations comprising:
   receiving, by an operation guard system executed within a cloud platform, session information representative of a session of a user within the cloud platform, the session information comprising user information and operation information;
   determining, by the operation guard system, that the user is signed into a technical group for execution of an operation represented in the operation information, and in response:
      providing, by the operation guard system, a risk score associated with the operation; and
   determining, by the operation guard system and at least partially based on the risk score, that the operation is a risk-oriented operation based on the risk score, and in response:
      preventing execution of the operation and transmitting an alert.

9. The non-transitory computer-readable storage medium of claim 8, wherein the session information is received from an operation guard node executed within a node of the cloud platform.

10. The non-transitory computer-readable storage medium of claim 8, wherein providing a risk score associated with the operation is at least partially based on one or more of a topology list and an operation token tree.

11. The non-transitory computer-readable storage medium of claim 10, wherein the topology list represents historical execution of the operation and the operation token tree represents an order of operations, each operation in the order of operations being associated with an operation type.

12. The non-transitory computer-readable storage medium of claim 8, wherein the operation guard system comprises a time-framed session manager that manages multiple concurrent sessions within the cloud platform.

13. The non-transitory computer-readable storage medium of claim 8, wherein the operation guard system comprises an account mapping assembler that generates an account mapping that maps a global account of the user to a technical account.

14. The non-transitory computer-readable storage medium of claim 8, wherein the operation comprises one of migrating data from a private cloud to a public cloud within the cloud platform and cleaning up a resource within the cloud platform.

15. A computer system, comprising:
   a processor; and
   a non-transitory computer-readable medium coupled to the processor and having instructions stored thereon which, when executed by the processor, cause the processor to perform operations for natural language explanations for real-time identification of operations as risk-oriented operations in cloud platforms, the operations comprising:
- receiving, by an operation guard system executed within a cloud platform, session information representative of a session of a user within the cloud platform, the session information comprising user information and operation information;
- determining, by the operation guard system, that the user is signed into a technical group for execution of an operation represented in the operation information, and in response:
  - providing, by the operation guard system, a risk score associated with the operation; and
- determining, by the operation guard system and at least partially based on the risk score, that the operation is a risk-oriented operation based on the risk score, and in response:
  - preventing execution of the operation and transmitting an alert.

16. The computer system of claim 15, wherein the session information is received from an operation guard node executed within a node of the cloud platform.

17. The computer system of claim 15, wherein providing a risk score associated with the operation is at least partially based on one or more of a topology list and an operation token tree.

18. The computer system of claim 17, wherein the topology list represents historical execution of the operation and the operation token tree represents an order of operations, each operation in the order of operations being associated with an operation type.

19. The computer system of claim 15, wherein the operation guard system comprises a time-framed session manager that manages multiple concurrent sessions within the cloud platform.

20. The computer system of claim 15, wherein the operation guard system comprises an account mapping assembler that generates an account mapping that maps a global account of the user to a technical account.

* * * * *